J. H. McCORMICK.
DRAW GEAR AND BUFFING APPARATUS.
APPLICATION FILED MAR. 8, 1913.

1,127,657.

Patented Feb. 9, 1915.

Inventor
John H. McCormick

UNITED STATES PATENT OFFICE.

JOHN H. McCORMICK, OF BEXLEY, OHIO.

DRAW-GEAR AND BUFFING APPARATUS.

1,127,657.  Specification of Letters Patent.  Patented Feb. 9, 1915.

Application filed March 8, 1913. Serial No. 752,917.

*To all whom it may concern:*

Be it known that I, JOHN H. McCORMICK, a citizen of the United States, residing at Bexley, in the county of Franklin and State of Ohio, have invented certain new and useful Improvements in Draw-Gear and Buffing Apparatus, of which the following is a specification.

My invention relates to those devices used for resisting and absorbing shocks and particularly to draw gear and buffing apparatus.

One object of my invention is to so construct a device of this kind, to which ready access may be had for purposes of inspection and in which the multiplicity of parts usually found in the assemblage of these devices, is very materially reduced. In carrying out this idea, I preferably provide a plurality of friction members which are identical in shape and which may, therefore, be used interchangeably.

My friction members are preferably provided with formations that, when the members are in their assembled condition, will resist their transverse movement when under compression. By this construction I am enabled to eliminate the use of all types of casings and at the same time attain practically the same amount of friction surface as with a casing. By oppositely disposing adjacent friction members and consequently providing these formations upon opposite ends of adjacent friction members, I provide a structure that will give a very even and uniform distribution of the internal forces over the friction surfaces. The formations thus arranged, may also be constructed that their terminating shoulders may be used for the purpose of limiting the longitudinal movement of the gears as a whole. I also desirably longitudinally taper my friction members and resist their transverse movement when under compression, by an unyielding structure preferably adjacent each end of the assembled gear. This unyielding portion I desirably make an integral portion of the resisting spring commonly used in connection with gears of this type.

Figure 1:
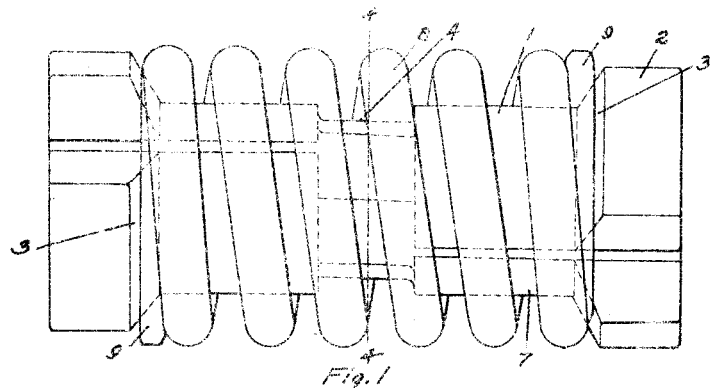
Figure 2:
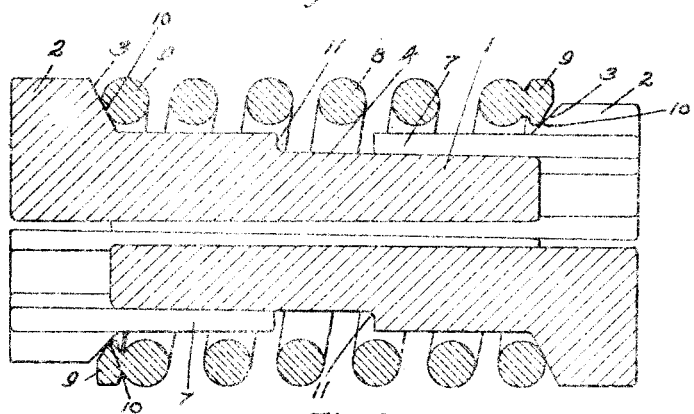
Figure 3:
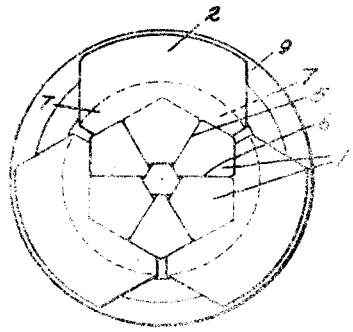
Figure 4:
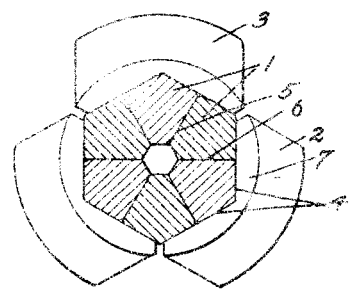

The preferred embodiment of my invention is shown in the accompanying drawings, in which similar characters of reference designate corresponding parts, and in which:

Figure 1 is a side elevation of my draft gear shown assembled and removed from its rigging. Fig. 2 is a central longitudinal section of the structure shown in Fig. 1, Fig. 3 is a view of the structure shown in Fig. 1 and looking from the left of the drawing, and, Fig. 4 is a section taken on line 4—4 of Fig. 1 with the spring removed.

My invention is shown as comprising a plurality of sectoral friction members 1, each provided with a terminal lug 2. These lugs 2 have an inclined face 3, which serves as a wedging face in a manner to be hereinafter described. When assembled, these friction members form a substantially solid cylinder and, as will be noted, each abutting member is oppositely disposed. By reference to Figs. 3 and 4, it will further be noted that each of the members 1 has its outer faces 4 longitudinally tapered inward. Also, the abutting faces 5 and 6 are tapered inward, the purposes of which will be hereinafter described. Each friction member 1 is provided with wing formations 7 adapted to coact with the faces 4 to give resisting friction surfaces. The alternate arrangement of these friction members thereby provides an embracing structure at each end of the gear for the small ends of each of the friction members and thereby prevents their outward displacement and serves as a means for resisting their transverse movement.

Encircling the entire assemblage of friction members is the ordinary coiled spring 8, which normally maintains the friction members in condition of release. In order to attain the desired wedging action under compression of the friction members, I provide wedging means which coact with the surfaces 3, which means I have shown as being the portion 9 integrally formed upon the coiled spring 8. In order to attain the maximum capacity, it is essential that these wedging means be unyielding transversely and I, therefore, preferably weld the two end coils of the spring 8 together to form a solid ring, which ring may be beveled as shown at 10 to coact with the wedging faces 3 of the friction members.

From the alternate arrangement of the friction members 1, it will be seen that the spring 8 normally tends to maintain them in full release position, but upon the application of pressure at either end of the gear, the spring 8 will naturally become compressed, the faces 10 of the end coils 9 acting as a wedge upon the inclined faces 3 of the lugs 2, thereby wedging the members into close relative engagement. The longitudinal taper of each of the friction members 1, upon their relative movement, also creates a wedging action increasing the capacity of the gear and thereby causing a slight expansion of the assembled members. This expansion is permitted by a relative movement between the surfaces 10 of the end coils 9 and the wedging faces 3 of the friction members 1. The wing formations 7 carried by each of the friction members, terminating in shoulders 11 short of the middle of each member, provide a means for limiting the longitudinal movement of the gear by the oppositely disposed formations coming into engagement with each other. The amount of this movement may, therefore, be regulated by the length of the wing formations 7 from the lugs 2. The longitudinal taper of all the friction faces, aside from creating a wedging action upon compression, also serves a purpose of assisting in release of the gear after it has performed its function.

From the above description, it will be noted that I have provided an extremely simple draft gear in which the friction members themselves form practically the entire gear and which friction members may be used interchangeably, if desired. I have simplified and cheapened the manufacture and repair by building a symmetrically balanced structure from a substantially single form and size of casting that may be constructed to provide its own casing. Also, by the provision of the wing formations 7, a bearing surface may be had at each end of each of the friction members of equal intensity and the transverse movement of each of the members regulated thereby. When assembled, my friction members produce a substantially solid segmental cylinder having all its parts interlocking.

What I claim, is:

1. A draw gear and buffing apparatus comprising a plurality of friction members having coöperating friction faces, means for holding said members in assembled condition, and formations carried by said members for resisting their transverse movement under compression.

2. A draw gear and buffing apparatus comprising a plurality of friction members having coöperating friction faces, a spring for holding said members in assembled condition and normally maintaining them in release position, and formations carried by said members for resisting their transverse movement under compression.

3. A draw gear and buffing apparatus comprising a plurality of friction members having coöperating friction faces adapted to offer resistance by longitudinal movement, a spring for normally maintaining a release position of said members, and wing formations forming a part of said members for resisting their transverse separation under compression.

4. A draw gear and buffing apparatus comprising a plurality of sectoral friction members having coöperating friction faces adapted to offer resistance by relative longitudinal movement, a spring for normally maintaining a release position of said members, and wing formations forming a part of said members for resisting their transverse separation under compression.

5. A draw gear and buffing apparatus comprising a plurality of friction members having coöperating friction faces and external friction faces, wing formations forming a part of said members and provided with internal friction faces contacting with the external friction faces of adjacent members, and means for normally maintaining release position of said members.

6. A draw gear and buffing apparatus comprising a plurality of sectoral friction members having coöperating friction faces and external friction faces, adjacent members being arranged to offer resistance by relative movement, wing formations forming a part of said members and arranged to lie in engagement with portions of the external faces of adjacent members, and means for normally maintaining release position of said members.

7. A draw gear and buffing apparatus comprising a plurality of sectoral friction members having coöperating friction faces and external friction faces, adjacent members being arranged to offer resistance by relative movement, wing formations forming a part of said members and arranged to lie in engagement with portions of the external faces of adjacent members, wedging shoulders on said members, and a spring encircling said members and arranged to bear directly on said shoulders.

8. A draw gear and buffing apparatus comprising a plurality of sectoral friction members having coöperating friction faces and external friction faces, adjacent members being arranged to offer resistance by relative movement, wing formations forming a part of said members and arranged to lie in engagement with portions of the external faces of adjacent members, wedging shoulders on said members, and a spring encircling said members and arranged to bear directly on said shoulders, said wing formations being oppositely arranged on adjacent members and being of a length to engage each other to limit their relative movement.

9. A draw gear and buffing apparatus comprising a plurality of friction members identical in structure and engaging each other frictionally, formations carried by said members for resisting their transverse separation under compression, and a spring for normally maintaining release position of said members.

10. A draw gear and buffing apparatus comprising a plurality of friction members identical in structure and engaging each other frictionally, formations carried by said members for resisting their transverse separation under compression, and a spring for normally maintaining release position of said members, said formations limiting the relative longitudinal movement of said members.

11. A draw gear and buffing apparatus comprising a plurality of interfitting sectoral friction members identical in structure and engaging each other frictionally, adjacent members being oppositely disposed, wing formations carried by one end of each member adapted to engage frictionally the free end of the opposing members, and a spring for normally maintaining release position of said members.

12. A draw gear and buffing apparatus comprising a plurality of friction members, formations forming a part of said members for controlling their transverse movement, wedging shoulders carried by said members, and a spring for normally maintaining release position of said members and coacting with said wedging faces to produce a wedging action.

13. A draw gear and buffing apparatus comprising a plurality of friction members, wedging shoulders carried by said members, formations carried by said members for controlling their transverse movement, and a spring for normally maintaining release position of said members, said spring being provided with wedging faces for coaction with said wedging shoulders.

14. A draw gear and buffing apparatus, a plurality of friction members, wedging shoulders carried by said members, formations carried by said members for controlling their transverse movement, said formations limiting the longitudinal movement of said members, and a spring for coaction with said wedging shoulders.

15. A draw gear and buffing apparatus comprising a plurality of interfitting sectoral friction members tapered in the direction of their movement, shoulders on said members for limiting their longitudinal movement, wedging shoulders carried by said members, and a spring for normally maintaining release position of said members, said spring coacting with said wedging shoulders.

16. A draw gear and buffing apparatus comprising a plurality of interfitting sectoral friction members tapered in the direction of their movement, wedging shoulders carried by said members, formations carried by said members for controlling their transverse movement, said formations limiting the longitudinal movement of said members, and a spring for normally maintaining release position of said members, said spring having both its ends provided with wedging faces.

In testimony whereof I affix my signature in presence of two witnesses.

JOHN H. McCORMICK.

Witnesses:
 WALTER E. L. BOCK,
 A. L. PHELPS.